United States Patent
McKenzie

[15] 3,680,247
[45] Aug. 1, 1972

[54] ARTIFICIAL FISHING LURE

[72] Inventor: Benjamin L. McKenzie, 155 Sir Oliver Rd, Norfolk, Va. 23505

[22] Filed: June 1, 1970

[21] Appl. No.: 42,067

[52] U.S. Cl. ................43/42.17, 43/42.36, 43/42.39
[51] Int. Cl. ...........................................A01k 85/00
[58] Field of Search.....43/42.17, 42.08, 42.36, 44.89

[56] References Cited

UNITED STATES PATENTS

| 2,214,668 | 9/1940 | Erickson | 43/42.08 |
| 3,555,717 | 1/1971 | Gautsche, Jr. | 43/42.17 |
| 3,230,657 | 1/1966 | Wiswald | 43/42.17 |

FOREIGN PATENTS OR APPLICATIONS

| 600,897 | 7/1960 | Canada | 43/42.17 |
| 1,332,705 | 6/1963 | France | 43/42.17 |
| 1,422,333 | 11/1965 | France | 43/42.36 |

Primary Examiner—Samuel Koren
Assistant Examiner—Daniel J. Leach
Attorney—Cushman, Darby & Cushman

[57] ABSTRACT

An artificial fishing lure comprising a body having a longitudinal bore therethrough to hold a wire means extending through the bore so that the wire means can be positioned in a plurality of positions, either allowing a gang hook mounted on the wire means to be held with its shaft substantially parallel to the axis of the lure body, or in a position wherein the gang hook is angular to the axis of the body. An angular shaft hook is mounted on the wire means forward of the body and is spaced by bead means from a rotatable spinner also mounted forward of the body on the wire means.

7 Claims, 4 Drawing Figures

INVENTOR
BENJAMIN L. McKENZIE

BY Cushman, Darby & Cushman
ATTORNEYS

ARTIFICIAL FISHING LURE

The invention generally relates to an artificial fishing lure for sporting or commercial use but particularly relates to an artificial fishing lure which can be used for surface or underwater fishing.

The present invention has the general form of the bait it is supposed to simulate and is constructed so that it can be easily adjusted to float on the surface of the water or under the surface of the water. The present invention is preferably constructed of lightweight buoyant materials so that when used as a surface lure it can be cast and upon contacting the water surface will not make a splash or disturbance that would scare the fish. The lure is easy to cast and control while in the air and can be made to alight on the surface like a bug, or wounded minnow floating high with the hooks retracted until they are barely in the water, so that a fish when striking the lure will come in primary contact with the hook or hooks. When used as a semi-surface or underwater lure, the hooks hang down in the normal or usual fishing position. The hooks can be retracted or hang down when the lure is used in this manner and upon being cast will stand upright or in a vertical position in the water, the retractable hooks being entirely out of the water until such time as the lure is reeled in.

In the surface casting, the lure is rarely snagged because of the position of the hooks, resulting in a maximum amount of fishing with a minimum amount of lost time.

The present invention can take the form of a bug or a live fish or minnow, though preferably it has a general minnow configuration.

These and other objects and advantages of the invention will appear more clearly from the following specifications in connection with the accompanying drawings in which.

Figure 1:
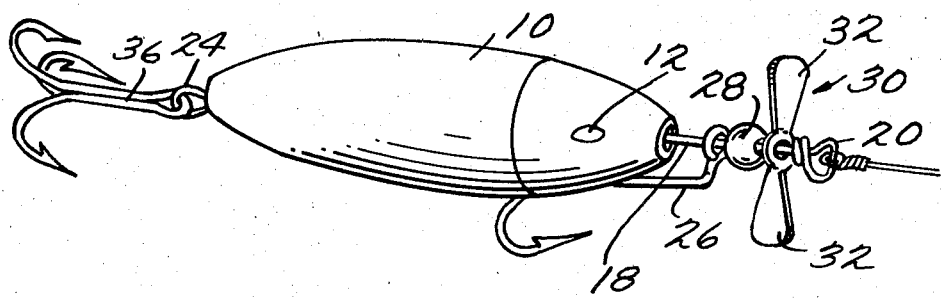
FIG. 1 is a perspective view of the fishing lure.

The artificial fishing lure as shown in FIGS. 1 through 4 comprises a body 10 which is preferably shaped to simulate a small fish or minnow, although it can be shaped or colored to simulate other types of bait. The body is preferably made of cork or some other light and buoyant substance and has a rounded or substantially eliptical cross section. The body 10 preferably has artificial eyes 12 mounted therein or painted thereupon and a passage, channel or bore 14 which runs longitudinally therethrough. The body can be polished, painted, lacquered or dyed in any particular color or combination of colors as desired. The bore 14 is of such a diameter that an elongated wire member 16 can be passed therethrough and positioned therein. The body of the lure acts as a sleeve and when the elongated wire member 16 is pulled forward the ganged hook 36 is locked in place. This feature enables the user without the use of tools to replace the retractable hooks in the shortest possible time by moving the body of the lure forward and sliding it back to lock in place. The elongated wire member 16 preferably has a doubled-over portion 22 at one end of its stem or shaft 18 forming a substantially "J-shaped" configuration with the other end of the stem or shaft 18 being formed in an integral or connected loop or eye 20. The doubled-over end 22 of the shaft is bent or curved at 24 so that the shaft 18 and curved or doubled-over section 22 contact the inner surface of the body which defines the bore 14. The doubled-over section 22 extends substantially parallel to the main shaft 18 terminating at an end which is bent or angled towards the shaft 18 so that the elongated wire member 16 can be placed or positioned in the bore 14 of the body 10 without the end of section 22 contacting the body. The elongated wire member 16 is preferably constructed of spring steel or other suitable resilient material so that the curved or doubled-over section 22 is pressed towards the shaft 18, decreasing the distance between the doubled section and main shaft until the distance is less than the diameter of the bore so that the wire member can be placed within the bore. When placed inside the bore 14 the doubled-over section 22 and the shaft 18 are continually forced away from each other by the material trying to resume its original configuration so that the shaft and doubled-over section press against the inner surface of the body 10. When the doubled-over section 22 is removed from the bore 14 the section 22 resumes its original set shape which is substantially the same size or greater than the diameter of the bore 14. The curved or bent portion 24 of the wire member is constructed so that it can extend through the eye of a gang hook 36 holding the gang hook in position. The elongated wire member 16 also preferably passes through the eye of an angled shaft hook 26, a bead or plurality of beads 28 and a spinner 30. The angled shaft hook 26 is preferably constructed so that one segment of the shaft of the hook extends from the eye surrounding the elongated wire member 16 to a distance substantially equal to or greater than the radius of body 10 whereupon it is bent approximately 90°, following the axis of the elongated wire member 16 so that the angled shaft hook in part substantially conforms to the body of the artificial fishing lure. It is of course apparent that the angled shaft hook 26 can be angled at any degree to allow the hook to substantially conform to the lure body. A movable bead or beads 28 is or are slidably positioned on the elongated wire member between the angular shaft hook 26 and a spinner 30 to act as a spacer and to allow the spinner 30 to revolve upon the surface of the movable bead to reduce friction. The spinner 30 has an aperture therethrough for mounting it to the wire member 16 and is formed with blades 32 which are constructed to cause a rotational movement as the fishing lure is pulled through the water. The spinner 30 has a multifold purpose of giving the lure life-like action, positioning the angular shaft hook 26 under the belly portion of the lure body when the lure is in motion, and cooperating to provide a soft landing for the lure body in the water when the lure is cast. The spinner 30 can be formed of any material as is desired, as for example, a material which can be formed to provide varying actions of the lure or it can be formed of a rigid plastic or material so that a uniform blade action can be maintained. The spinner itself can be constructed of polished natural metal or it can be brightly colored to reflect light rays from available sources to attract fish.

A split shot or weight 34 can be attached in front of the spinner to convert the artificial lure to an underwater lure.

Figure 2:
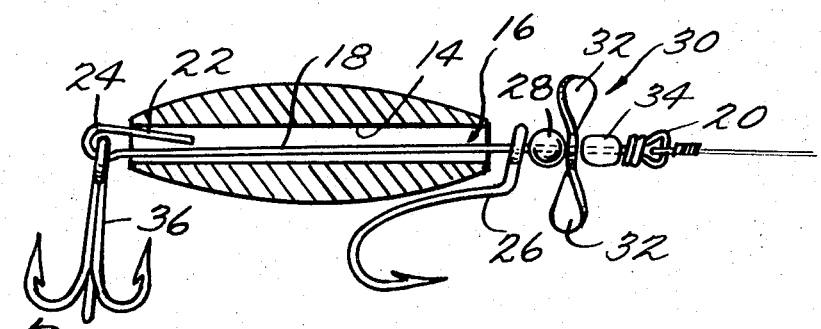
FIG. 2 is a cross sectional view of the fishing lure of FIG. 1 showing the lure when adapted for underwater usage.
Figure 3:
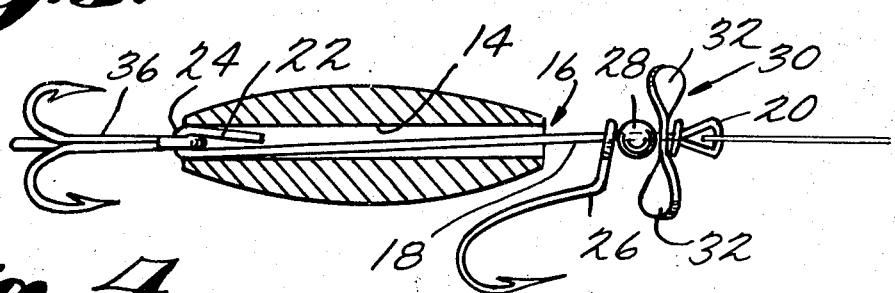
FIG. 3 is a cross sectional view of the fishing lure of FIG. 1 showing the lure adapted for water surface usage.
Figure 4:
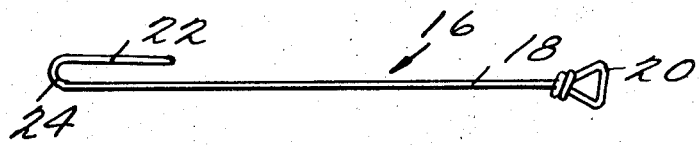
FIG. 4 is a plan view of the elongated wire member shown in FIGS. 1, 2 and 3.

The bead or beads 28 which are preferably slidably mounted on the elongated wire member 16 separate the spinner 30 from the angled shaft hook 26 so that spinner 30 will have free movement when rotating as it is pulled through the water without interference from the hooks or body of the lure. The bead 28 is preferably constructed of a plastic material and is brightly colored to add to the attractiveness of the lure. It is apparent of course that the bead can be constructed of any other material, as for example, heavy material which will serve the multifold purpose of adding weight to the lure and separating and cooperating with the spinner 30. Mounted in the curved or bent section 24 of the elongated wire member 16 is a gang hook 36 which is retractable into the body or comes into contact with it as shown in FIG. 3. As shown by FIG. 2, the lure is converted for underwater usage by adding a split shot or weight 34 on the elongated wire member 16. The positioning of the hooks of the lure is accomplished by pushing or sliding the wire member rearwardly until the curved or bent section 24 of the wire member extends from the body allowing the eye of the gang hook 36 to freely move within the bent or doubled-over portion 22. The curved section 24 also can act as a stop means keeping the gang hook in position when the lure is converted into a surface lure. The lure is converted into an effective surface lure by pulling the elongated wire member 16 forward so that the end of the gang hook 36 contacts the rear of the body of the lure or is partially pulled into the passageway or bore 14 where it becomes substantially secured. When the gang hook 36 is in this position the lure becomes practically weedless because the area that the hooks cover is substantially reduced.

Although the present invention has been described and illustrated in connection with various embodiments, it is to be understood that, modifications and variations may be resorted to without departing from the spirit of the invention, as those skilled in this art will readily understand. Such modifications and variations are considered to be within the purview and scope of the present invention as defined by the appended claims.

What is claimed is:

1. An artificial fishing lure comprising a body of buoyant material having a longitudinal bore formed therethrough, elongated wire means extending through said bore in said body and adapted to be positioned in a plurality of positions, one end of said elongated wire means being doubled over to hold a gang hook and the other end having means for attachment to a fishing line, said gang hook contacting the bore so as to extend substantially in the direction of said bore in a first position of said wire means and hanging freely from said one end in a second position of said wire means, an angular shaft hook is mounted on said wire means forward of said body, a spacer is mounted on said wire means forward of said shaft hook; and a spinner is rotatably mounted on said wire means adjacent to and forward of said spacer.

2. An artificial fishing lure as claimed in claim 1 wherein said spacer comprises at least one bead.

3. An artificial fishing lure as claimed in claim 2 wherein said bead is a weight.

4. An artificial fishing lure as claimed in claim 1 wherein weight means is mounted on said elongated wire means forward of said spinner.

5. An artificial fishing lure as claimed in claim 4 wherein said weight means is a split shot.

6. An artificial fishing lure as claimed in claim 1 wherein said doubled-over portion terminates in an end portion angled towards said shaft.

7. An artificial fishing lure as claimed in claim 1 wherein said body has a substantially circular cross-sectional configuration.

* * * * *